(12) United States Patent
Kamalavannan (10) Patent No.: US 9,268,493 B2
(45) Date of Patent: Feb. 23, 2016

(54) SYSTEMS AND METHODS FOR SMART STORAGE INTERCONNECTION IN A HETEROGENEOUS STORAGE ENVIRONMENT

(71) Applicant: DELL PRODUCTS L.P., Round Rock, TX (US)

(72) Inventor: Hariharan Kamalavannan, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 468 days.

(21) Appl. No.: 13/688,186

(22) Filed: Nov. 28, 2012

(65) Prior Publication Data

US 2014/0149662 A1    May 29, 2014

(51) Int. Cl.
G06F 3/06 (2006.01)
H04L 12/931 (2013.01)

(52) U.S. Cl.
CPC ............ G06F 3/0632 (2013.01); G06F 3/0607 (2013.01); G06F 3/067 (2013.01); G06F 3/0689 (2013.01); H04L 49/356 (2013.01)

(58) Field of Classification Search
CPC ... H04L 49/356; G06F 3/0607; G06F 3/0689; G06F 3/067; G06F 3/0632; G06F 12/08
USPC .......... 709/249; 711/100, 101, 111, 112, 114, 711/116, 117
See application file for complete search history.

(56) References Cited

U.S. PATENT DOCUMENTS

| | | | |
|---|---|---|---|
| 6,425,049 B1 * | 7/2002 | Yamamoto et al. | 711/112 |
| 6,820,171 B1 * | 11/2004 | Weber et al. | 711/114 |
| 6,915,379 B2 * | 7/2005 | Honda et al. | 711/114 |
| 7,650,412 B2 * | 1/2010 | Coatney et al. | 709/226 |
| 7,836,249 B2 * | 11/2010 | Aruga | G06F 3/0613 710/316 |
| 8,086,768 B2 * | 12/2011 | Watanabe et al. | 710/38 |
| 8,140,657 B2 * | 3/2012 | Saklecha et al. | 709/223 |
| 8,621,059 B1 * | 12/2013 | Kong et al. | 709/223 |
| 8,949,503 B2 * | 2/2015 | Aruga | G06F 3/0613 710/316 |
| 2002/0002638 A1 * | 1/2002 | Obara | G06F 3/0601 710/11 |
| 2004/0015691 A1 * | 1/2004 | Collette | H04L 12/56 713/161 |
| 2005/0188247 A1 * | 8/2005 | Abe | G06F 3/0614 714/5.1 |
| 2005/0240792 A1 * | 10/2005 | Sicola | G06F 11/0751 714/1 |
| 2007/0006020 A1 * | 1/2007 | Fujita | G06F 3/0613 714/6.11 |
| 2008/0046647 A1 * | 2/2008 | Blinick et al. | 711/114 |
| 2008/0091972 A1 * | 4/2008 | Tanaka et al. | 714/5 |
| 2008/0147934 A1 * | 6/2008 | Nonaka et al. | 710/74 |
| 2009/0063767 A1 * | 3/2009 | Graves et al. | 711/114 |
| 2009/0276594 A1 * | 11/2009 | Fujii et al. | 711/162 |
| 2011/0213928 A1 * | 9/2011 | Grube | G06F 3/065 711/114 |
| 2012/0185643 A1 * | 7/2012 | DeKoning et al. | 711/114 |
| 2013/0124798 A1 * | 5/2013 | Aszmann | G06F 3/0689 711/114 |
| 2013/0145064 A1 * | 6/2013 | Radovanovic | 710/113 |

* cited by examiner

*Primary Examiner* — Ebrahim Golabbakhsh
(74) *Attorney, Agent, or Firm* — Haynes and Boone, LLP (57) ABSTRACT

An information handling system is provided. The information handling system includes a plurality of storage subsystems a back-end switch connected to each storage subsystem to communicate information about each of the plurality; and a redundant array of independent disks (RAID) volume. Each storage subsystem includes a RAID engine, a storage drive; and a plurality of input ports and output ports. The RAID volume includes the storage drive on a first storage subsystem of the plurality and the storage drive on a second storage subsystem of the plurality. Methods for providing such a system are also disclosed.

20 Claims, 6 Drawing Sheets

SYSTEMS AND METHODS FOR SMART STORAGE INTERCONNECTION IN A HETEROGENEOUS STORAGE ENVIRONMENT

BACKGROUND

1. Technical Field

The present disclosure is related to information handling systems. In particular, embodiments disclosed herein are related to a smart interconnection system and method for heterogeneous, dynamic storage environments.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The marketplace currently presents a number of different storage subsystems for use in storage environments. The different storage subsystems may each have a number of benefits and disadvantages in specific situations. Additionally, new storage technology is continually being developed. However, the differences between different varieties of subsystems may prevent the sharing of storage resources across different subsystems, thus increasing costs and effort in maintaining heterogeneous storage environments.

SUMMARY

Consistent with some embodiments, there is provided an information handling system. The information handling system may include a plurality of storage subsystems. Each storage subsystem may a redundant array of independent disks (RAID) engine, a storage drive; and a plurality of input ports and output ports. The information handling system may further include a back-end switch connected to each storage subsystem so as to communicate information about each storage subsystem of the plurality and a RAID volume. The RAID volume includes the storage drive on a first storage subsystem of the plurality and the storage drive on a second storage subsystem of the plurality.

Consistent with some embodiments, there is further provided a method for accessing storage drives between storage subsystems. The method may include steps of providing a plurality of storage subsystems connected in a domain by a back-end switch, exchanging information about each storage subsystem between each of the plurality, and designating one of the plurality of storage subsystems as a domain master subsystem. The domain master system may hold the information exchanged as indicated above. The method may further include steps of creating a RAID volume that includes a storage drive from at least two of the plurality of storage subsystems; and storing data from a host to the RAID volume. Other embodiments may provide another method for accessing storage drives between storage subsystems. The method may include steps of connecting a plurality of storage subsystems with a back-end switch, designating one of the plurality of storage subsystems as a domain master subsystem, and collecting information about each of the plurality of storage subsystems in the domain master subsystem. The method may further include steps of identifying unused drives in the plurality of storage subsystems from the collected information; and creating a RAID volume that includes at least one of the unused drives.

These and other embodiments will be described in further detail below with respect to the following figures.

BRIEF DESCRIPTION OF THE DRAWINGS

In the drawings, elements having the same designation have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
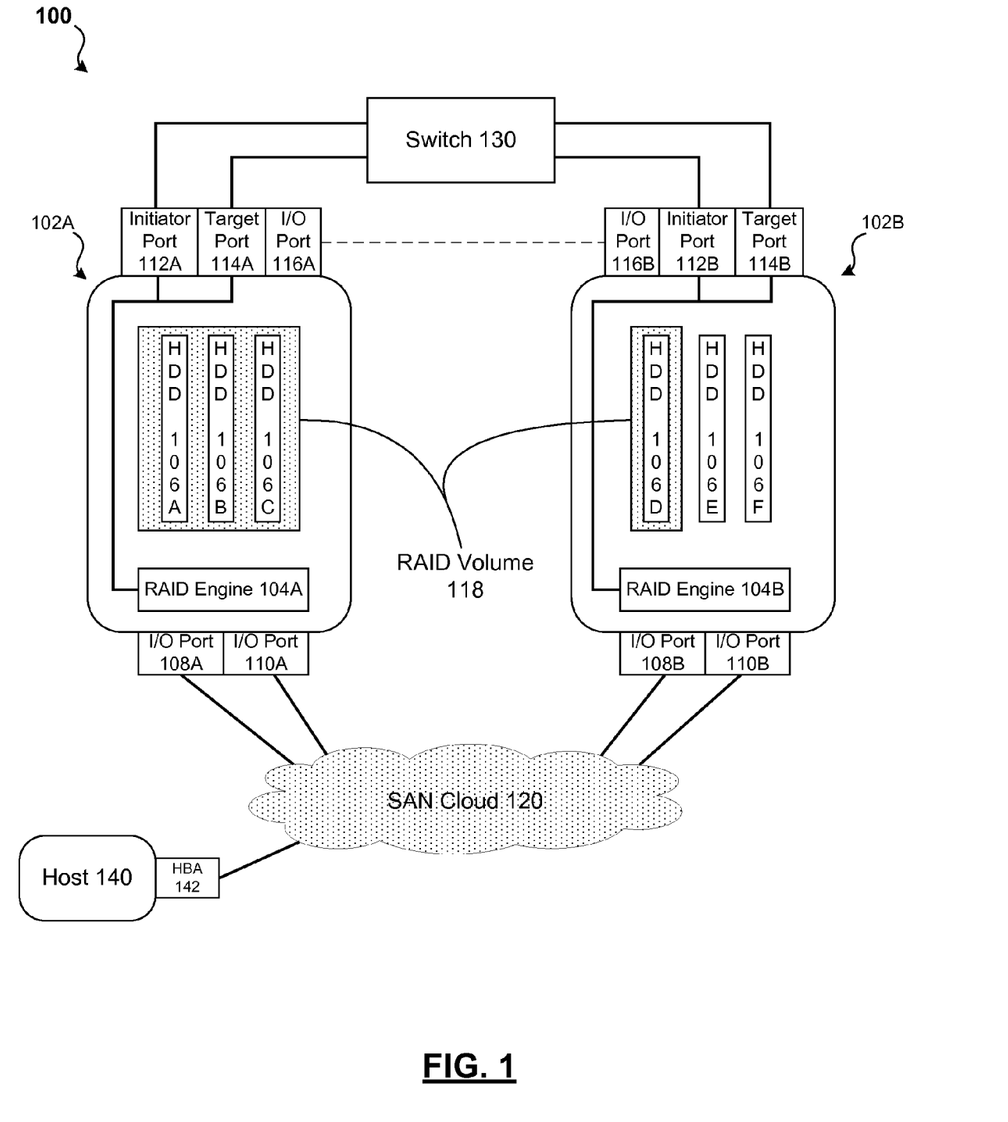
FIG. 1 depicts an information handling system for smart storage interconnection according to an embodiment.

FIG. 1 shows an exemplary information handling system 100 for providing smart storage of data consistent with some embodiments. As depicted, information handling system 100 includes a number of larger components in the systems including two storage subsystems 102A and 102B that are connected to a storage area network (SAN) cloud 120 at the front end and to a switch 130 at the back end. Information handling system 100 also includes a host 140 which must access data on and write data to storage subsystems 102A and 102B through SAN cloud 120.

Each of storage subsystems 102A and 102B may include a redundant array of independent disks (RAID) engine, a plurality of storage drives, a controller (which in this embodiment is provided by the RAID engine), and a number of input and output ports. Thus, storage subsystem 102A may include a RAID engine 104A, which in some embodiments, like the one depicted in FIG. 1, also serves as the controller for the subsystem 102A. RAID engine 104A is a computer processor or is provided by a computer processor. Input and output operations on storage subsystem 102A may be controlled by RAID engine 104A, and RAID engine 104A may also calculate parities and execute algorithms used for data storage in RAID volumes.

Storage subsystem 102A may include a plurality of storage drives, and as depicted includes three hard disk drives (HDDs) 106A, 106B, and 106C. In other embodiments some or all of the storage drives represented by HDDs 106A-C may be solid-state drives (SSDs), which use integrated circuits, such as DRAM or flash memory, to store data. In yet other embodiments, some of HDDs 106A-C are hard disk drives and some are solid-state drives. Additionally, while the depicted embodiment includes three HDDs, other embodiments may include more or fewer storage drives.

Storage subsystem 102A includes a first storage area network (SAN) input/output (I/O) port 108A and a second SAN I/O port 110A. SAN I/O ports 108A and 110A are both used to receive information from and transmit information to a SAN cloud 120, which will be discussed in more detail. Other embodiments may include more SAN I/O ports. Having multiple SAN I/O ports by which data may move between SAN cloud 120 and storage subsystem 102A may provide for higher throughput and increased reliability in the event of a link failure. SAN I/O ports 108A and 110A may support one of a number of protocols used in the storage of data. Such protocols may include Fibre Channel (FC), Internet Small Computer Storage Interface (iSCSI), Serially Attached Small Computer Storage Interface (SAS), Fibre Channel over Ethernet (FCoE), and others. In some embodiments, SAN I/O port 108A and SAN I/O port 110A may be configured in conjunction with the controller of storage subsystem 102A to support more than one such protocol. SAN I/O ports 108A and 110A may be referred to as the front-end interface of storage subsystem 102A.

Storage subsystem 102A further includes a back-end interface. As depicted, the back-end interface of storage subsystem 102A includes an initiator port 112A, a target port 114A and a direct back-end I/O port 116A. Storage system 102B may include equivalent ports, similarly designated. Initiator port 112A and target port 114A are connected to a switch 130, which facilitates communications between subsystems via their back-end interfaces. As depicted, switch 130 is an FC switch, and communications facilitated by switch 130 are performed according to the Fibre Channel protocol, although other embodiments may allow for other protocols.

Additionally, switch 130 may provide conversion between storage protocols. For example, switch 130 may allow an FC-based storage subsystem 102A to communicate via the back-end interface with an iSCSI-based storage subsystem 102B by converting between the storage protocols. Back-end I/O port 116A allows direct communication between subsystems based on the same storage protocol. Thus, for example, if both storage subsystems 102A and 102B are FCoE-based storage subsystems, back-end I/O port 116A and a back-end I/O port 116B may be directly connected to provide a direct communication link, as shown by the dashed line in FIG. 1.

Information handling system 100 may include many storage subsystems similar to storage subsystem 102A. In the depicted embodiment, information handling system 100 includes a second storage subsystem, storage subsystem 102B. In many respects, storage subsystem 102B is similar to storage subsystem 102A. Thus, the depicted embodiment of storage subsystem 102B has a RAID engine 104B, three hard disk drives 106D, 106E, and 106F, a SAN I/O port 108B, a SAN I/O port 110B, an initiator port 112B, a target port 114B, and a back-end I/O port 116B. The description of the various features of storage subsystem 102A is applicable to storage subsystem 102B.

Additionally, host 140 is connected to SAN cloud 120. Host 140 is a server, or in other embodiments it may be a client device, that needs to access data stored on storage subsystems connected to SAN cloud 120 or to store data on the storage subsystems. SAN cloud 120 is a computer network that provides access to a plurality of data storage devices, such as storage subsystems 102A and 102B, through a network of SAN switches. In the depicted embodiment, host 140 includes a host bus adaptor (HBA) 142, a network interface that allows host 140 to communicate with SAN cloud 120 over a Fibre Channel protocol. Other embodiments of host 140 may include other network interfaces to allow communication with SAN 120 over a different protocol.

In some instances, host 140 may need to access data on or write data to a RAID volume 118, which includes HDDs from both storage subsystems 102A and 102B. As depicted, RAID volume 118 includes HDDs 106A, 106B, and 106C on storage subsystem 102A and HDD 106D on storage subsystem 102B. RAID volume 118 combines these HDDs into a single logical unit. Other embodiments may feature different grouping of HDDs 106A-F.

By way of example, host 140 uses a logical unit number (LUN) for RAID volume 118 to write data for storage. The LUN associated with RAID volume 118 may have been mapped to host 140 previously. The request is sent by HBA 142 to SAN cloud 120, which in turn directs the write request to SAN I/O port 108A of storage subsystem 102A based on the LUN associated with RAID volume 118. In this example, storage subsystem 102A is an FC-based subsystem and is the RAID volume master for RAID volume 118. Thus, information about RAID volume 118 is available to RAID engine 104A, which controls access to the HDDs of RAID volume 118. RAID engine 104A receives the write request from SAN I/O port 108A and analyzes the write request with a logical block addressing (LBA) table to determine how the data contained in the write request should be distributed among HDDs 106A, 106B, 106C, and 106D within RAID volume 118.

In this example, RAID engine 104A determines what portion of the data of the write request should be written to HDD 106D on storage subsystem 102B, an iSCSI-based subsystem. RAID engine 104 passes the write request to initiator port 112A, from which the write request is transmitted to switch 130 with instructions to transmit the write request to storage subsystem 102B. Switch 130 converts the write request from an FC protocol format to an iSCSI protocol format and transmits the write request to target port 114B on storage subsystem 102B. The write request is transmitted to RAID engine 104B, which checks the logical block address of the write request and then writes the portion of data to HDD 106D.

RAID engine 104B then transmits an acknowledgment of the successful write back to RAID engine 104A. The acknowledgment is sent from RAID engine 104B to initiator port 112B, then to switch 130, which handles protocol conversion and transmits the acknowledgement to target port 114A. From target port 114A, the acknowledgment is sent to RAID engine 104A. In turn, RAID engine 104A sends the acknowledgement to SAN cloud 120, which finally routes the acknowledgement to host 140.

In other embodiments, RAID engine 104 may pass the write request to a back-end interface having an initiator mode and a target mode. In such embodiments, initiator ports 112A and 112B and target ports 114A and 114B may be provided by two configurable I/O ports, one on each storage subsystem. A configurable I/O port on storage subsystem 102A may change to the initiator mode to provide initiator port 112A, and may transmit the write request to switch 130 with the instructions to transmit the write request to storage subsystem 102B. Switch 130 may transmit the write request to a configurable I/O port on storage subsystem 102B which may be in target mode, to provide target port 114B, and thus able to receive the write request. The write request may then transmitted to RAID engine 104B, which writes data to HDD 106D.

RAID engine 104B may transmit an acknowledgment of the successful write back to RAID engine 104A. The acknowledgment is sent from RAID engine 104B to the configurable I/O port of storage subsystem 102B, which changes to initiator mode, to provide initiator port 112B, to send the acknowledgment to switch 130. Switch 130 sends the acknowledgment to the configurable I/O port of storage subsystem 102A, which may be in the target mode to providing target port 114A. From the combined I/O port, the acknowledgement may be sent to RAID engine 104A. In turn, RAID engine 104A may send the acknowledgement to SAN cloud 120, which may route the acknowledgement to host 140.

To better provide the functionality described above, one of the storage subsystems of information handling system 100 may be selected as a domain master storage subsystem. In the depicted embodiment, a single storage subsystem connected to switch 130 is elected as domain master storage subsystem at an election held automatically at the time of an addition of a storage subsystem to information handling system 100 or a departure of a storage subsystem from information handling system 100. While fully applicable to information handling system 100, the domain master storage subsystem may be more easily understood with reference to FIG. 2.

Figure 2:
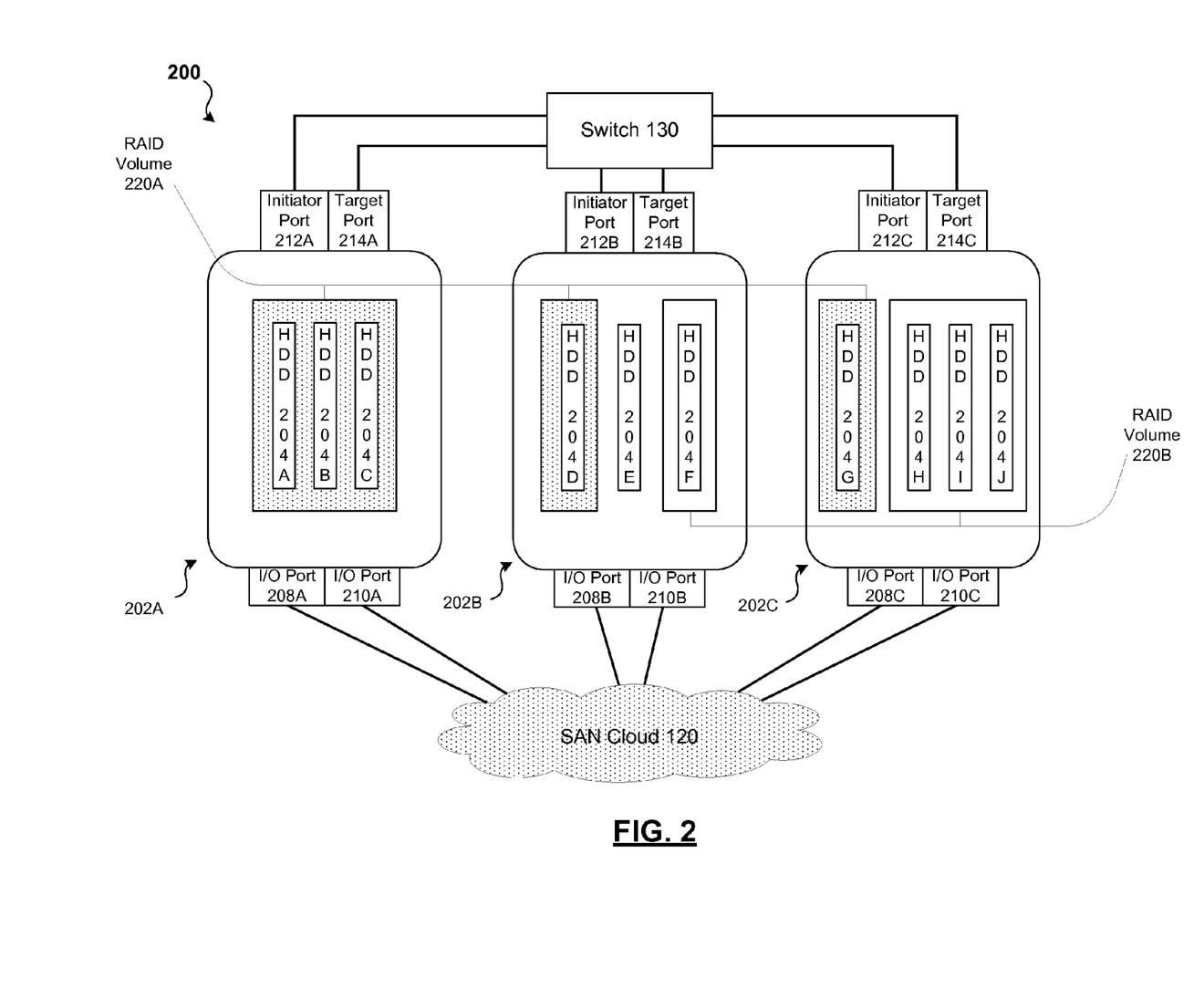
FIG. 2 depicts an information handling system for smart storage with a RAID volume with five storage drives on three storage subsystems environment according to an embodiment.

FIG. 2 depicts an information handling system for smart storage with a RAID volume with five storage drives on three storage subsystems according to an embodiment. Unlike the embodiment depicted in FIG. 1, information handling system 200 includes three storage subsystems: storage subsystems 202A, 202B, and 202C. Storage subsystems 202A and 202B each include three storage drives, while storage subsystem 202C includes four. Thus, storage subsystem 202A includes HDDs 204A-C; storage subsystem 202B includes HDDs 204D-F, and storage subsystem 202C includes HDDs 204G-J. In other embodiments of information handling system 200, there may be more storage subsystems present with more or fewer storage drives in each subsystem. Further, some storage drives may be SSDs rather than HDDs.

Each storage subsystem in information handling system 200 is connected to switch 130: storage subsystem 202A by initiator port 212A and target port 214A, storage subsystem 202B by initiator port 212B and target port 214B; and storage subsystem 202C by initiator port 212C and target port 214C. Additionally, SAN I/O port 208A and SAN I/O port 210A connect storage subsystem 202A to a SAN cloud 120. Likewise, SAN I/O port 208B and SAN I/O port 210B connect storage subsystem 202B to SAN cloud 120, while a SAN I/O port 208C and SAN I/O port 210C connect storage subsystem 202C to SAN cloud 120.

One of the storage subsystems acts as a domain master storage subsystem for all storage subsystems connected to a single back-end switch. In the depicted embodiment, storage subsystem 202B acts as the domain master storage subsystem for the three storage subsystems connected to switch 130. In information handling system 200, the domain master storage subsystem is chosen by an election process. The storage subsystems exchange world wide node numbers (WWNNs) whenever a new subsystem joins the domain, the domain being the group of storage subsystems connected to switch 130. The exchange also occurs when a storage subsystem leaves the domain. After exchanging WWNNs, the subsystem with the lowest WWNN is elected as the domain master subsystem.

The domain master subsystem collects information from the other storage subsystems in the domain over the back-end ports and through switch 130. The information collected by the domain master subsystem may include: the total number of storage subsystems in the domain, the total number of storage drives on each of the storage subsystems and whether each of those drives is used or unused. The information may also include the number of RAID volumes in the domain and the identity of the domain master of each RAID volume.

As depicted in FIG. 2, storage subsystem 202B includes information that indicates: there are three storage subsystems in the domain for which storage subsystem 202B is the domain master; there are three HDDs on storage subsystem 202A that are part of RAID volume 220A for which storage subsystem 202A is the volume master, but RAID volume 220A also includes HDD 204D of storage subsystem 202B and HDD 204G of storage subsystem 202C; there three HDDs on storage subsystem 202C that are part of RAID volume 220B for which storage subsystem 202C is the volume master, and RAID volume 220B also includes HDD 204F of storage subsystem 202B; there is an unused HDD, HDD 204E on storage subsystem 202B. There may also be information available to storage subsystem 202B as domain master regarding the type of RAID volumes in the domain. Thus, storage subsystem 202B may contain information that RAID volume 220A is a level 5 RAID and that RAID volume 220B is a level 6 RAID. This information may be made available to a user connected to SAN cloud 120, and the collection of this information may be facilitated by RAID engines (not depicted) on each of storage subsystems 202A, 202B, and 202C.

If information handling system 200 only included a single RAID, such as RAID volume 220A, and a user wanted to create an additional RAID, such as RAID volume 220B, the user could receive information about the availability of the storage resources within the domain from domain master storage subsystem 202B. This information would indicate that HDDs 204E and 204F on storage subsystem 202B and HDDs 204H, 204I, and 204J on storage subsystem 202C are unused by the existing RAID. If the user wanted to create a level 6 RAID, the user could request that the three unused HDDs on storage subsystem 202C and an unused drive on storage subsystem 202B be used to create the desired level 6 RAID. Storage subsystem 202B, as the domain master would virtually map either HDD 204E or 204F to a RAID 6 in connection with the unused drives on storage subsystem 202C. The RAID volume master would be storage subsystem 202C.

This may be performed even though storage subsystem 202B and 202C support different protocols. For example, even though storage subsystem 202B is an SAS-based storage subsystem while storage subsystem 202C is an FCoE-based system, a RAID volume can span both storage subsystems because whenever they share data through their back-end interfaces, switch 130 can be configured to handle protocol conversions. As another example, a fourth, iSCSI-based storage subsystem could be added to the domain, and a user could add an HDD from the iSCSI-based storage subsystem to either RAID volumes of information handling system 200, again with no problems caused by the insertion of the fourth storage subsystem or by the different protocols.

Figure 3:
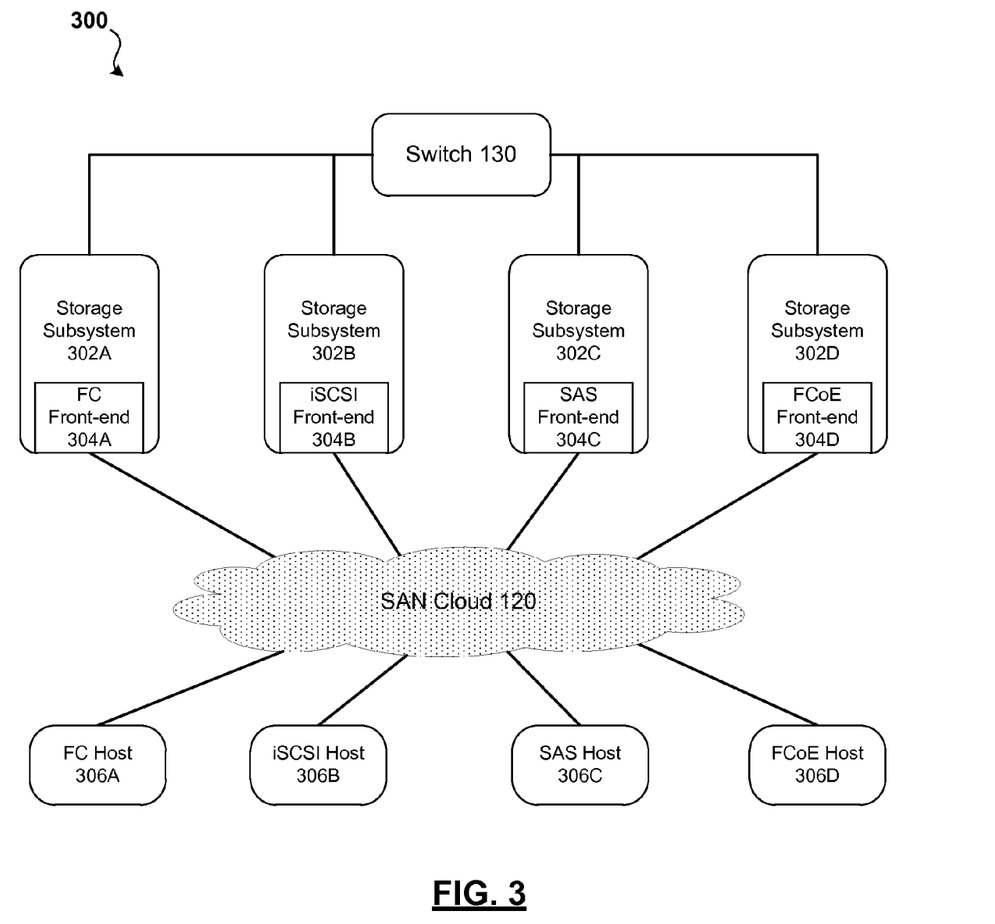
FIG. 3 depicts an information handling system for smart storage with a mixed protocol environment according to an embodiment.

FIG. 3 depicts an information handling system 300 for smart storage with a mixed protocol environment, consistent with some embodiments. Information handling system 300 includes a SAN cloud 120 and a switch 130 similar to those described above in connection with information handling system 100. SAN cloud 120 is configured to provide for the conversion of protocols that are used in storage networks. Thus, SAN cloud 120 may be able to convert transmissions that conform to Fibre Channel, iSCSI, SAS, or FCoE or other protocols. Likewise, switch 130 may be able to convert between these protocols and others.

Information handling system 300 includes a plurality of storage subsystems connected to SAN cloud 120 and switch 130. As depicted, information handling system 300 includes four storage subsystems, storage subsystems 302A, 302B, 302C, and 302D. Each depicted storage subsystem has a front-end interface that is configured to receive information according to a particular protocol. Thus, storage subsystem 302A includes an FC front-end interface 304A, a storage subsystem 302B includes an iSCSI front-end interface 304B; storage subsystem 302C includes an SAS front-end interface 304C; and storage subsystem 302D includes an FCoE front-end interface 304D.

Information handling system 300 also includes a plurality of hosts connected to SAN cloud 120. The hosts include an FC host 306A, an iSCSI host 306B, an SAS host 306C, and an FCoE host 306D. By having the SAN switches that make up SAN cloud 120 able to convert between protocols, FC host 306A can store data on a RAID volume having storage subsystem 302C as its RAID volume master storage subsystem, even though storage subsystem 302C has an SAS front-end interface 304C. As another example, iSCSI host 306B can store data on a RAID volume having storage subsystem 302D as its RAID volume master even though storage subsystem 302D has an FCoE front end interface 304D. Thus, hosts in information handling system 300 are able to store data by sending it to any one of the storage subsystems even if the particular host and the particular storage subsystem do not support the same protocol.

Figure 4:
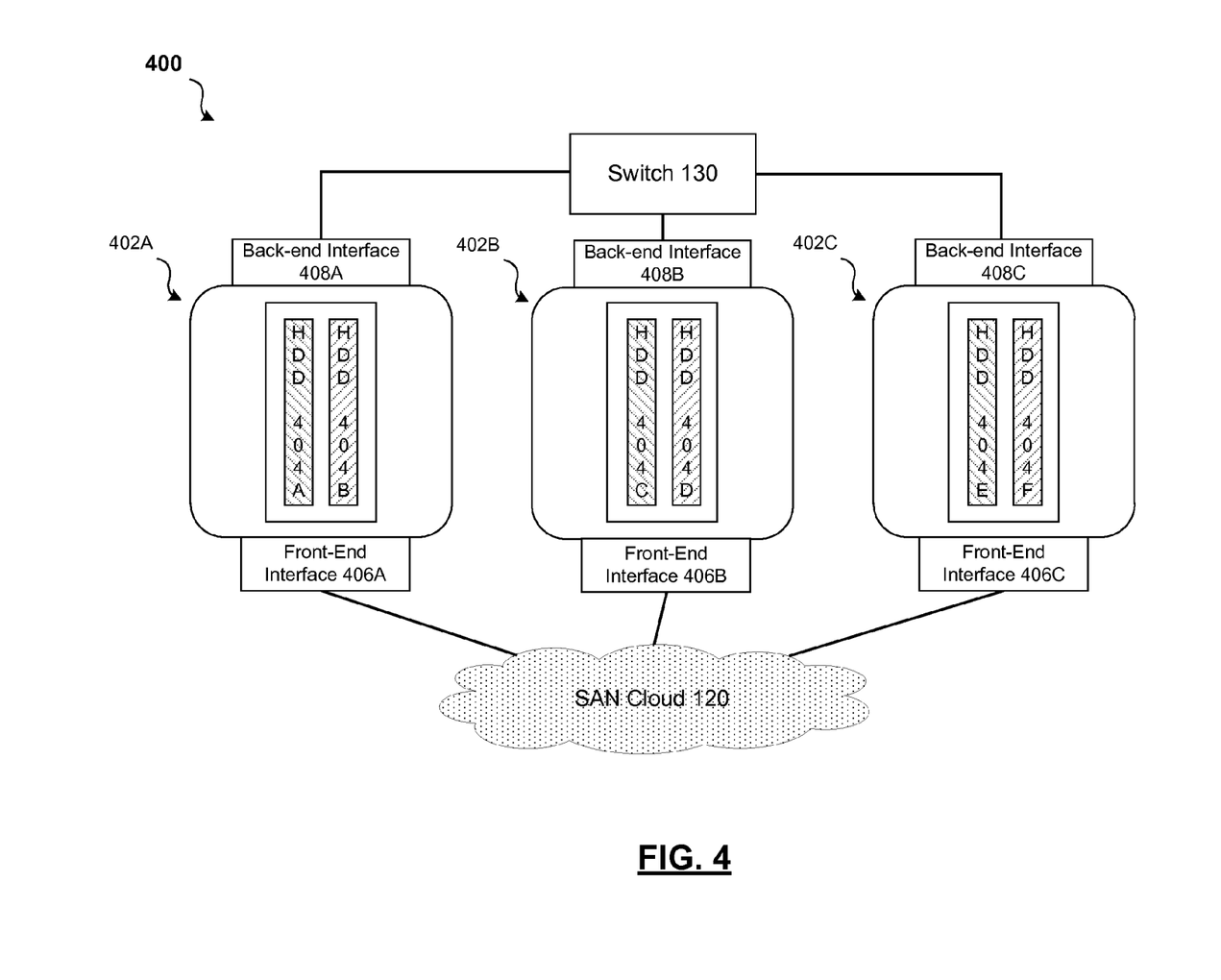
FIG. 4 depicts an information handling system for smart storage in a multi-protocol environment according to an embodiment.

FIG. 4 depicts an information handling system 400 for smart storage in a multi-protocol environment according to an embodiment. Information handling system 400 includes a plurality of storage subsystems, including storage subsystems 402A, 402B, and 402C. Each of the storage subsystem is depicted as containing two storage drives, but other embodiments may contain more. Each of storage subsystems 402A, 402B, and 402C is connected to a SAN cloud 120 by a front-end interface 406A, 406B, and 406C, respectively. Front-end interfaces 406A, 406B, and 406C may each include a plurality of I/O ports, similar to the front-end I/O ports described in connection with FIGS. 1, 2, and 3, with each port being individually connected to SAN cloud 120. Also, at the back end, each of storage subsystems 402A, 402B, and 402C is connected to a switch 130 by a back-end interface 408A, 408B, and 408C, respectively. Each back-end interface may provide the back-end ports as described in connection with FIG. 1.

In information handling system 400, one storage drive on each storage subsystem is used for purposes other than ordinary data storage. For example, an HDD 404B may be used on storage subsystem 402A as a mirrored hard drive to provide data after an adverse event occurs with an HDD 404A. In another embodiment, HDD 404F may work as a cache/swap space when exporting the contents of HDD 404E. In yet another embodiment, HHD 404D may be used as a back-up in the event that HDD 404C fails on storage subsystem 402B. These embodiments may be provided in conjunction with embodiments of information handling systems 100, 200, and 300.

Figure 5:
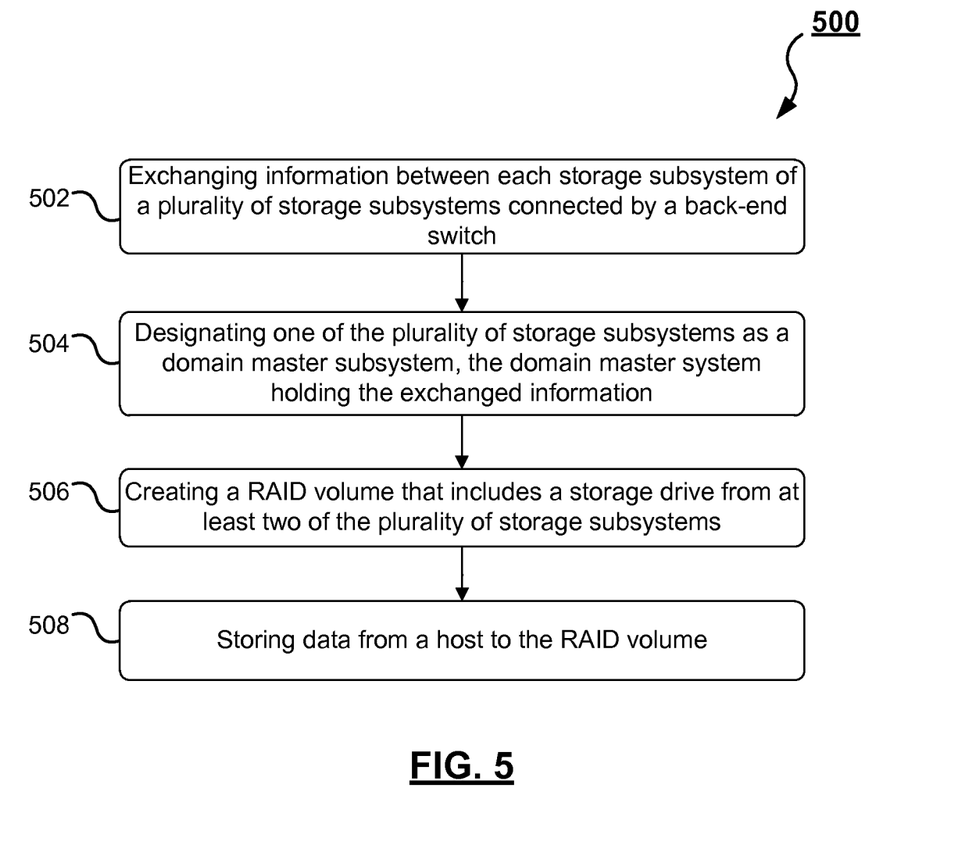
FIG. 5 is a flowchart of a method for accessing storage drives between storage subsystems in an information handling system according to an embodiment.

FIG. 5 is a flowchart of a method 500 for accessing storage drives between storage subsystems in an information handling system according to an embodiment. Method 500 may begin when a plurality of storage subsystems are connected in a domain by a back-end switch, and the connected subsystems multicast their WWNNs to each other, in step 502. The storage subsystem with the lowest WWNN in the domain will be designated by all the connected storage subsystems as the domain master storage subsystem, in step 504. The domain master subsystem may gather information from newly added storage subsystems. This information includes such things as the number of hard drives on each storage subsystem, the RAIDs on each storage subsystem and the volume master storage subsystem of each RAID volume, the number of unused hard drives, and so on.

A user in communication with the domain master subsystem may create a RAID volume that includes a storage drive from at least two of the plurality of storage systems, in step 506. These storage subsystems may operate based on different protocols, such as FC on one storage subsystem and SAS on another other. In step 508, the back-end switch may handle conversions between protocols so that the storage subsystems may both be used when the user stores data from a host to the RAID volume, with both storage drives being used to store the data.

As an example, method 500 may be performed using an information handling system 200 as disclosed above. Supposing storage subsystem 202C is added to 202A and 202B in information handling system 200 by connection to a back-end switch, upon the addition, storage subsystems 202A, 202B, and 202C exchange data packets that include their respective WWNNs (step 502). In this example, storage subsystem 202B has the lowest WWNN and is elected (or re-elected) as the domain master storage subsystem for the three storage subsystems (504). Storage subsystem 202B may collect information from 202C such as the number of storage drives it has, etc. Storage subsystem 202B may already have collected information from storage subsystem 202A, but in that event it may update the information.

A user may communicate with storage subsystem 202B as the domain master to retrieve information regarding the use of storage drives in the domain. The user may then create a RAID volume, such as RAID volume 220B using unused HDDs on storage subsystem 202C and one unused HDD on storage subsystem 202B (step 506). Alternatively, a user may indicate a storage need to storage subsystem 202B, which may recognize what storage drives can be configured in a RAID volume 220B to meet that need. RAID volume 220B may have storage subsystem 202C designated as its RAID volume master.

The user or host may store data to the RAID volume 220B by sending a write request through SAN cloud 120 to the RAID volume master designated by the LUN associated with RAID volume 220B, in this case storage subsystem 202C. The RAID engine of storage subsystem 202C may then direct a portion of the data to be transmitted over an initiator port 212A to a target port 214B of storage subsystem 202B. Even though storage subsystem 202C and 202B support different protocols, information may be exchanged through their back-end ports because switch 130 may convert between the protocols to facilitate such exchanges. After the exchange the RAID engine of storage subsystem 202B may store the data (step 508). An acknowledgment of a successful write may be sent back to the host by the reverse path.

Figure 6:
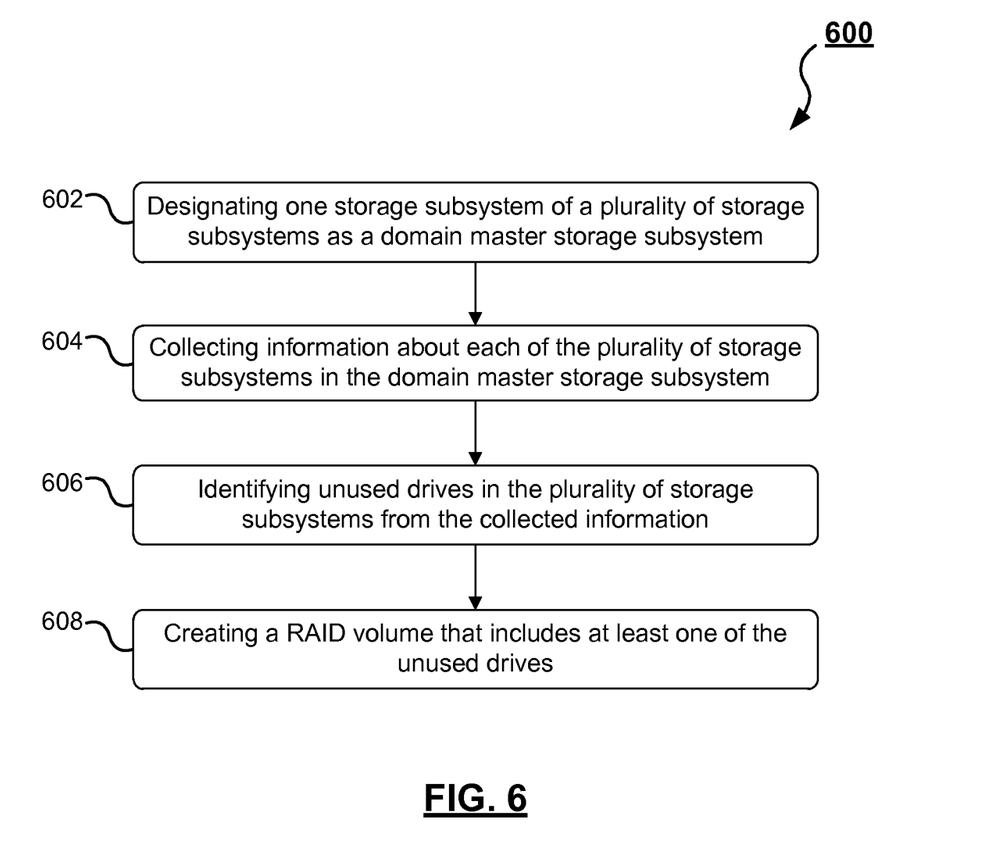
FIG. 6 is a flowchart of a method for accessing storage drives between storage subsystems in an information handling system according to another embodiment.

FIG. 6 is a flowchart of a method 600 for creating RAID volumes across storage subsystems supporting different storage protocols in an information handling system like those described herein. A plurality of storage subsystems may be connected in a domain by a back-end switch. Upon the addition or departure of a storage subsystem, all storage subsystems in the domain will exchange WWNNs, and the storage subsystem with the lowest WWNN will be designated as the domain master storage subsystem of the plurality, in step 602. The domain master storage subsystem may collect information regarding each of the storage subsystems in the domains in step 604. Some of the information may be used in step 606 to identify unused storage drives on each of the storage subsystems. The unused storage drives are resources that may be allocated upon request to augment or create RAID volumes. Thus, in step 608, a user may create a RAID volume that includes at least one of the unused drives. This RAID volume may span across storage subsystems within the domain that use different storage protocols.

In order to better explain method 600, reference will be made to information handling system 200 of FIG. 2. Supposing storage subsystems 202C is connected to a switch 130 that is already being used to facilitate communication between storage subsystems 202A and 202B, all the storage subsystems may exchange WWNNs. The storage subsystem with the lowest WWNN may be designated the domain master storage subsystem (step 602). In this example, storage subsystem 202A is designated as the domain master. Storage subsystem 202A may collect information from storage subsystems 202B and 202C regarding the number of HDDs and their status as in-use or not in-use (steps 604 and 606). Other information may include the number of RAIDs present on a storage subsystem and the identity of RAID volume master storage subsystems. A user may then create a RAID volume, such as RAID volume 220B using the unused HDDs on storage subsystem 202C and one unused HDD on storage subsystem 202B (step 608). Storage subsystem 202C may be designated as the RAID volume master storage subsystem, and this information may be communicated to storage subsystem 202B as the domain master.

Some embodiments of all or part of information handling system 200 include non-transient, tangible, machine-readable media that includes executable code that when run by a computer processor, such as may provide RAID engine 104, may cause the computer processor to perform the steps of methods 500 and 600 as described above. Some common forms of machine-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system, comprising:
a first storage subsystem that is configured to operate according to a first protocol and that includes a first redundant array of independent disks (RAID) engine, a first storage drive coupled to the first RAID engine, a first front-end interface, and a first configurable back-end interface that the first storage subsystem configures in an initiator mode to send communications and a target mode to receive communications;
a second storage subsystem that is configured to operate according to a second protocol that is different than the first protocol and that includes a second redundant array of independent disks (RAID) engine, a second storage drive coupled to the second RAID engine, a second front-end interface, and a second configurable back-end interface that the second storage subsystem configures in an initiator mode to send communications and a target mode to receive communications;
a back-end switch that is coupled to the first configurable back-end interface and the second configurable back-end interface, wherein the back-end switch is configured to convert communications between the first protocol and the second protocol; and
a first RAID volume including the first storage drive and the second storage drive.

2. The information handling system of claim 1, further comprising:
a storage area network (SAN) coupled to the first front-end interface and the second front-end interface.

3. The information handling system of claim 2, further comprising:
a host coupled to the SAN.

4. The information handling system of claim 2, further comprising:
a first host that is coupled to the SAN and configured to communicate according to the first protocol, and a second host that is coupled to the SAN and configured to communication according to the second protocols.

5. The information handling system of claim 1, wherein each of the first RAID engine and the second RAID engine is provided by a computer processor executing instruction to perform a set of functions associated with that RAID engine.

6. The information handling system of claim 4, wherein the first protocol and the second protocol are selected from a Fibre Channel protocol, an Internet Small Computer System Interface protocol, a Serial Attached Small Computer System Interface protocol, and a Fibre Channel over Ethernet protocol.

7. The information handling system of claim 1, wherein the first storage subsystem is a master storage subsystem and the second storage subsystem is a slave storage subsystem.

8. The information handling system of claim 7, wherein the slave storage subsystem includes a third storage drive, and wherein the master storage subsystem is configured to determine that the third storage drive is unused and, in response, use the third storage drive in a second RAID volume.

9. The information handling system of claim 1, wherein the first storage subsystem is configured to:
receive a write request to the first RAID volume;
configure the first configurable back-end port to an initiator mode; and
send a first protocol write request to the back-end switch through the first configurable back-end port operating in the initiator mode; and
wherein the back-end switch is configured to convert the first protocol write request to a second protocol write request and send the second protocol write request to the second storage subsystem.

10. The information handling system of claim 9, wherein the second storage subsystem is configured to:
configure the second configurable back-end port to a target mode;
receive the second protocol write request and, in response, write data to the second storage drive;
configure the second configurable back-end port to an initiator mode; and
send a second protocol write acknowledgement to the back-end switch through the second configurable back-end port operated in the initiator mode.

11. A method for providing a RAID volume, comprising:
receiving, by a first storage subsystem operating according to a first protocol, a write request to a first redundant array of independent disks (RAID) volume that includes a first storage drive that is located in the first storage subsystem and a second storage drive that is located in a second storage subsystem that operates according to a second protocol that is different than the first protocol;
reconfiguring, by the first storage subsystem, a first configurable back-end port to from a target mode to an initiator mode;
sending by the first storage subsystem through the first configurable back-end port operating in the initiator mode, a first protocol write request to a back-end switch; and
converting, by the back-end switch, the first protocol write request to a second protocol write request and sending the second protocol write request to the second storage subsystem.

12. The method of claim 11, wherein the first protocol and the second protocol are selected from a Fibre Channel protocol, an Internet Small Computer System Interface protocol, a Serial Attached Small Computer System Interface protocol, and a Fibre Channel over Ethernet protocol.

13. The method of claim 11, further comprising:
sending, by a host that is coupled to the first storage subsystem through a storage area network (SAN), the write request that is directed to the first RAID volume.

14. The method of claim 13, further comprises:
performing, by the SAN, a protocol conversion on the write request and forwarding the write request to the first storage subsystem.

15. The method of claim 11, further comprising:
determining, by the first storage subsystem, that that the second storage subsystem includes an unused storage drive and, in response, using the unused storage drive in a second RAID volume.

16. The method of claim 11, further comprising:
receiving, by the back-end switch, a second protocol write acknowledgment from the second storage subsystem,
converting, by the back-end switch, the second protocol write acknowledgement to a first protocol write acknowledgement and sending the first protocol write acknowledgement to the first storage subsystem;
reconfiguring, by the first storage subsystem, the first configurable back-end port from the initiator mode to the target mode and receiving the first protocol write acknowledgement through the first configurable back-end port operating in the target mode; and
forwarding, by the first storage subsystem, the first protocol write acknowledgement to a host.

17. A method for providing a RAID volume, the method comprising:
receiving, by a back-end switch from a first storage subsystem operating according to a first protocol, a first protocol write request to a first redundant array of independent disks (RAID) volume that includes a first storage drive that is located on the first storage subsystem and a second storage drive that is located on a second storage subsystem that operates according to a second protocol that is different than the first protocol;
converting, by the back-end switch, the first protocol write request to a second protocol write request and sending the second protocol write request to the second storage subsystem;
reconfiguring, by the second storage subsystem, a second configurable back-end port from an initiator mode to a target mode; and
receiving, by the second storage subsystem through the second configurable back-end port operating in the target mode, the second protocol write request and, in response, writing data to the second storage drive according to the second protocol write request.

18. The method of claim 17, further comprising:
creating, by the second storage subsystem, a second protocol write acknowledgement;
reconfiguring, by the second storage subsystem, a second configurable back-end port from the target mode to an initiator mode;
sending, by the second storage subsystem through the second configurable back-end port operating in the initiator mode, the second protocol write acknowledgement to the back-end switch; and
converting, by the back-end switch, the second protocol write acknowledgement to a first protocol write acknowledgement and sending the first protocol write acknowledgement to the first storage subsystem.

19. The method of claim 17, wherein the first protocol and the second protocol are selected from a Fibre Channel protocol, an Internet Small Computer System Interface protocol, a Serial Attached Small Computer System Interface protocol, and a Fibre Channel over Ethernet protocol.

20. The method of claim 17, further comprising:
sending, by the second storage subsystem to the first storage subsystem through the back-end switch, information about an unused storage drive in the second storage subsystem;
creating, by the first storage subsystem, a second RAID volume using the unused storage drive.

\* \* \* \* \*